Sept. 5, 1967         L. LEITZ         3,339,472

PHOTOGRAPHIC CAMERAS

Filed Feb. 23, 1965

INVENTOR
Ludwig Leitz
BY Smyth, Roston & Pavitt
Attorneys 3,339,472
PHOTOGRAPHIC CAMERAS
Ludwig Leitz, Wetzlar (Lahn), Germany, assignor to
Ernst Leitz GmbH., Wetzlar, Germany, a corporation
of Germany
Filed Feb. 23, 1965, Ser. No. 434,366
2 Claims. (Cl. 95—11)

ABSTRACT OF THE DISCLOSURE

A camera is provided with a window internally surrounded by a resilient ring engaging a film cartridge when inserted in the camera and defining a light path from a portion of the wall of a film cartridge, which light path is lightproof with respect to the remainder of the interior of the camera. Characteristic indicia on the cartridge becomes visible externally.

---

Figure 1:
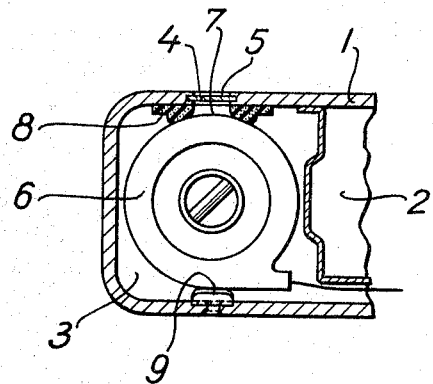

The present invention relates to improvements in photographic cameras, particularly of the type in which film is loaded into the camera by means of a cartridge.

It is known, in general, to equip a camera with a dial serving as a "reminder" and permitting the user of the camera to dial and set the film speed number as readily available, legible information. This dial, of course, is to be adjusted manually. Its principal disadvantage is that if the user of the camera forgets to properly set the dial when he loads the camera, the purpose of the reminder dial is defeated and might even add to confusion when the camera is used subsequently, as there is uncertainty whether the speed number set happens to be correct or not. This is particularly so if a long time has elapsed between loading of the camera and its subsequent use.

Other devices have been suggested in which the film cartridges are equipped with cams having a unique position and thereby defining the film speed in terms of a position code. The camera then has to be equipped with feelers sensing the respective position of the cam or cams on the film cartridge and the feelers then adjust an automatically operating film speed indicator. This has the disadvantage that for the purpose of film speed indication, additional movable parts have to be provided for in the camera, thus adding possible complications and difficulties in the construction thereof. In addition, of course, such a device fails to operate properly unless all of the cartridges on the market are equipped with such cams.

It is a primary object of the present invention to overcome these disadvantages and to equip the camera with a film speed indicator which is neither mechanically complicated nor can it produce uncertainty as to the type of film loaded into the camera.

It is suggested that the camera housing be equipped with a window at a location close to the chamber into which a film cartridge will be inserted. Thereupon a portion of the exterior wall of the film cartridge becomes visible through the window. This window is surrounded by a ring, sleeve, seal or the like, preferably made of a resilient material such as foam rubber to bear again the film cartridge when inserted into the camera. The seal, sleeve or ring serves the purpose to divide the interior space of the camera housing into two portions. The largest portion is to remain light proof since it accommodates the film as it extends from the cartridge to the take-up spindle. Thus, the ring serves to light tightly seal the major portion of the camera housing from the window. The purpose thereof is, of course, to prevent stray light from entering directly into the main chamber. On the other hand, the ring or sleeve renders a portion of the cartridge wall visible from the outside. The visible portion of the cartridge wall pertains to the cartridge body which serves by itself as a seal against light as far as the film in the cartridge is concerned.

The cartridge is preferably equipped with a marker or indicator to the film speed. It is suggested that this be made a general provision for all film cartridges on the market. On the other hand, if the user of the camera has a film cartridge which does not bear such an indication he cannot possibly be confused by an erronous indication. On the other hand, it is possible that prior to loading the user writes the film speed on the appropriate place on the cartridge; if he fails to do so, at least he will not be confused by an erroneous indication. The same situation is prevalent when the camera comes with a cartridge to be loaded with a film strip cut from a supply reel.

Figure 2:
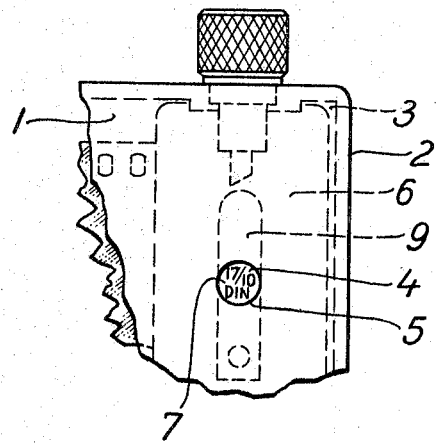

While the specification concludes with the claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIGURE 1 illustrates a cross section of view into the housing of a camera and particularly into the chamber destined to receive a film cartridge and incorporating the preferred embodiment of the invention; and FIGURE 2 illustrates a front view of the camera housing, particularly of the same portion thereof as shown in FIGURE 1.

Proceeding now to the detailed description of the drawing, there is shown a camera housing 2 having a front wall 1 which together with side and rear walls of the camera defines a chamber 3 destined to receive a film cartridge 6. The front wall 1 has a small, preferably circular window 5 covered by a protective glass plate 4 in order to dustproof the interior of the camera housing.

The cartridge 6 when inserted into the chamber 3 and retained therein in its normal position has a specific wall portion which then registers with the window 5. This wall portion of the cartridge bears numbers 7 which on any suitable scale provide an indication of the film speed or sensitivity. This indication becomes visible through the window 5, when the cartridge 6 is in its normal position in chamber 3.

The interior wall 1 around window 5 bears a sleeve, or sealing ring 8 preferably made of foam rubber. This sleeve or ring 8 is attached, for example, glued to the interior surface of wall 1 of the camera housing, and ring 8 bears resiliently against the wall of the cartridge 6 without covering the numbers. Thus, upon insertion of a cartridge the sealing ring 8 will be somewhat compressed in a direction normal to the window 5. This way the camera housing is basically divided into two portions. The larger portion is still light proof in that no light is permitted to pass through the ring 8 in lateral direction. On the other hand, the window 5 has opened up a light path into the interior of the housing to render the numbers or the markers 7 on the wall of the cartridge 6 visible from the exterior. However, the sealing ring 8 prevents light in this light path from escaping into the interior of the camera housing.

In order to prevent misalignment of the slot of cartridge 6 by virtue of the resilient action of ring 8, there is provided a spring such as a leaf spring 9. This spring 9 is positioned at the wall opposite to the front wall 1 and particularly opposite the window 5, so as to balance the resilient pressure exerted by the rubber seal 8 upon the cartridge.

The glass plate 4 is not necessarily a plane parallel plate but may have an optical active, i.e., curved surface to constitute a magnifying glass thereby facilitating the visibility of the markers 7 on the cartridge. It is not essential that the window 5 is in the front wall of the camera, but it may also be in the rear wall thereof. This will primarily depend on the overall structure of the camera. Rear wall positioning may be of particular advantage if the rear wall is hinged for opening the camera housing during loading or unloading.

The invention is not limited to the embodiments described above but all changes and modifications thereof not constituting departures from the spirit and scope of the invention are intended to be covered by the following claims.

What is claimed is:

1. In a photographic camera having a light proof housing, there being a chamber in the housing for receiving a film cartridge, the improvement comprising:

means defining a window in said camera housing positioned to register with said indicating means on said cartridge when inserted into said chambers; and resilient means in said housing for positioning a film cartridge when inserted into said chamber, said resilient means including a member having an opening registering with said window, said cartridge when inserted bearing against said resilient means and light tightly closing the ring space of said member thereby rendering a portion of the wall of the cartridge visible through said window without permitting light to enter from the window into the rest of the camera housing.

2. In a photographic camera having a light proof housing there being a chamber in the housing for receiving a film cartridge bearing means for visually indicating the film speed the film loaded in the camera, the improvement comprising:

means in said housing adjacent one interior wall thereof for resiliently engaging and positioning said cartridge in said housing;

means defining a window in said housing and being located in a wall thereof opposite to said wall having said resilient means, said window being further positioned to register with said indicating means on the cartridge when inserted into said chamber; and a light proof sleeve surrounding said window at said interior wall and engaging said cartridge against resilient reaction of said resilient means to define a light path between said indicating means and the exterior, through said window to the exclusion of the remaining portion of said housing.

References Cited
UNITED STATES PATENTS

| | | | |
|---|---|---|---|
| 1,295,758 | 2/1919 | Kesling | 95—1.1 |
| 2,160,710 | 5/1939 | Roehrl | 95—31 |
| 2,507,926 | 5/1950 | Noble | 95—34 |

JOHN M. HORAN, *Primary Examiner.*